(12) United States Patent
Schmidt et al.

(10) Patent No.: US 7,988,164 B2
(45) Date of Patent: Aug. 2, 2011

(54) ARRANGEMENT OF A ROLL STABILIZATION SYSTEM AND A STEERING SYSTEM ON A MOTOR VEHICLE

(75) Inventors: Wolfgang Schmidt, Landsberg (DE); Stephan Ertlmaier, Ismaning (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 12/825,090

(22) Filed: Jun. 28, 2010

(65) Prior Publication Data

US 2010/0264609 A1 Oct. 21, 2010

Related U.S. Application Data

(63) Continuation of application No. PCT/EP2009/000966, filed on Feb. 12, 2009.

(30) Foreign Application Priority Data

Feb. 19, 2008 (DE) .......................... 10 2008 009 874

(51) Int. Cl.
  B60G 21/10 (2006.01)
  B60G 5/04 (2006.01)
(52) U.S. Cl. ............... 280/124.107; 280/5.511; 180/443
(58) Field of Classification Search .................. 280/5.51, 280/5.511, 5.52, 124.107, 124.109; 180/209, 180/311, 443, 444
See application file for complete search history.

(56) References Cited

U.S. PATENT DOCUMENTS

| | | | |
|---|---|---|---|
| 4,796,911 A * | 1/1989 | Kuroki et al. | 280/5.511 |
| 4,837,692 A | 6/1989 | Shimizu | |
| 5,282,644 A * | 2/1994 | Larson | 280/638 |
| 5,489,114 A * | 2/1996 | Ward et al. | 280/638 |

(Continued)

FOREIGN PATENT DOCUMENTS

DE 37 11 099 C2 10/1988

(Continued)

OTHER PUBLICATIONS

German Search Report dated Jan. 14, 2009 including partial English-language translation (Nine pages).

(Continued)

*Primary Examiner* — Paul N. Dickson
*Assistant Examiner* — George D. Spisich
(74) *Attorney, Agent, or Firm* — Crowell & Moring LLP

(57) ABSTRACT

An arrangement of a roll stabilization system equipped with a split lateral stabilizer and an arrangement of a steering system on a double track motor vehicle is provided. A gear of the roll stabilization system is arranged essentially coaxially between two halves of the lateral stabilizer rotatable with respect to one another, and a motor for introducing a stabilization torque is arranged at the side of this gear and the lateral stabilizer. The steering system has, in addition to a steering gear, with which steering arms can be moved essentially in the transverse direction of the vehicle, a motor, which is arranged at the side of the steering gear and a movement axis defined by the movable steering arms. The motor of the roll stabilization system and the motor of the steering system lie in essence one behind the other, as viewed in the transverse direction of the vehicle, and may preferably be electric motors with essentially coinciding axes of rotation that run in the transverse direction of the vehicle and are arranged inside an axle carrier so as to lie essentially in the plane thereof.

10 Claims, 1 Drawing Sheet

U.S. PATENT DOCUMENTS

| | | | |
|---|---|---|---|
| 6,139,045 A * | 10/2000 | Vandenbark et al. | 280/638 |
| 6,405,113 B1 | 6/2002 | Yamawaki et al. | |
| 2009/0000368 A1 | 1/2009 | Pruckner | |

FOREIGN PATENT DOCUMENTS

| | | |
|---|---|---|
| DE | 101 42 388 A1 | 5/2002 |
| DE | 102 33 499 A1 | 1/2004 |
| DE | 10 2006 001 821 A1 | 7/2007 |
| DE | 10 2006 011 856 A1 | 9/2007 |
| EP | 2 050 597 A1 | 4/2009 |
| JP | 2004-27615 A | 1/2004 |

OTHER PUBLICATIONS

International Search Report dated May 25, 2009 including English-language translation (Six pages).

* cited by examiner

_US 7,988,164 B2_

ARRANGEMENT OF A ROLL STABILIZATION SYSTEM AND A STEERING SYSTEM ON A MOTOR VEHICLE

CROSS-REFERENCE TO RELATED APPLICATIONS

This application is a continuation of PCT International Application No. PCT/EP2009/000966, filed Feb. 12, 2009, which claims priority under 35 U.S.C. §119 from German Patent Application No. DE 10 2008 009 874.4, filed Feb. 19, 2008, the entire disclosures of which are herein expressly incorporated by reference.

BACKGROUND AND SUMMARY OF THE INVENTION

The invention relates to an arrangement of a roll stabilization system equipped with a split lateral stabilizer and to an arrangement of a steering system on a double track motor vehicle, wherein a gear of the roll stabilization system is arranged essentially coaxially between the two halves of the lateral stabilizer. The two halves of the lateral stabilizer can be rotated with respect to one another. A motor for introducing a stabilization torque is arranged at the side of the gear and the lateral stabilizer. The steering system has, in addition to a steering gear, with which steering arms, which ultimately act on the steerable wheels of the vehicle, can be moved essentially in the transverse direction of the vehicle, a motor, which is arranged at the side of the steering gear and a movement axis, which is described by the movable steering arms, and has the purpose of introducing a torque which assists or brings about such a movement. With respect to the technical background reference is made, for example, to DE 102 33 499 A1 and to DE 10 2006 001 821 A1.

Apart from the arrangement of an actuator motor, chosen by the assignee of the present invention at that time for mass production of a roll stabilization system and positioned coaxially to the split lateral stabilizer, the arrangement of this actuator motor away from the lateral stabilizer is already well-known from the prior art. Furthermore, it is possible to arrange in a comparable way a steering assist motor, for example, a gear rack, which extends in the transverse direction of the vehicle on a rack and pinion steering gear and to the ends of which are connected in a well-known manner the steering arms or steering tie rods that act ultimately on the steerable wheels. At the same time, the torque can be transmitted from the respective motor, of which the axis of rotation runs preferably in the transverse direction of the vehicle, to the respective gear, that is, to the gear "inside" the split lateral stabilizer and/or to, for example, the rack and pinion steering gear via a toothed gearing or an endless traction gear.

There is needed an advantageous arrangement of a roll stabilization system equipped with a split lateral stabilizer and an arrangement of a steering system on a motor vehicle.

This and other needs are met by an arrangement of a roll stabilization system equipped with a split lateral stabilizer and an arrangement of a steering system on a double track motor vehicle, wherein a gear of the roll stabilization system is arranged essentially coaxially between the two halves of the lateral stabilizer that can be rotated with respect to one another, and a motor for introducing a stabilization torque is arranged at the side of this gear and the lateral stabilizer. The steering system has, in addition to a steering gear, with which steering arms, ultimately acting on the steerable wheels of the vehicle, can be moved essentially in the transverse direction of the vehicle, a motor, which is arranged at the side of the steering gear and a movement axis, which is defined by the movable steering arms and has the purpose of introducing a torque which assists or brings about such a movement. The motor of the roll stabilization system and the motor of the steering system lie, essentially, one behind the other, as viewed in the transverse direction of the vehicle.

Advantageous embodiments and further developments are described herein.

The arrangement provides maximum compactness. That is, the available free space can be used optimally in this way. It is especially advantageous that in so-called right hand drive vehicles, in which a steering spindle, which transmits the driver's steering request from the steering wheel to the steering gear, runs in the right half of the vehicle, this entire arrangement can be configured in a simple way (with respect to the longitudinal axis of the vehicle) so as to be mirror symmetrical to the so-called left hand drive vehicles. Ideally, even a motor of identical design can be used for both the steering system and also the roll stabilization system, especially if in this case it involves electric motors with essentially coinciding axes of rotation that run preferably in the transverse direction of the vehicle.

The arrangement inside an axle carrier, which forms preferably a pre-assembly unit, has advantages during the assembly of the vehicle. In advantageous further developments, the motors or motor gear units, which units are formed by an assembly of the motor, the gear of the respective system (roll stabilization system, steering system) and an intermediate gear for transmitting the torque from the motor to the so-called system transmission, can serve to reinforce the axle carrier, for example, even with respect to a vehicle crash, by providing at least one suitable support.

Other objects, advantages and novel features of the present invention will become apparent from the following detailed description of one or more preferred embodiments when considered in conjunction with the accompanying drawing.

BRIEF DESCRIPTION OF THE DRAWING

The single FIGURE is a view from the bottom (in the direction of the vehicle's vertical axis) of a front axle carrier of a passenger vehicle equipped with the inventive arrangement of the roll stabilization system and the steering system for the front wheels (not shown in the FIGURE) of the motor vehicle.

DETAILED DESCRIPTION OF THE DRAWING

Figure 1:
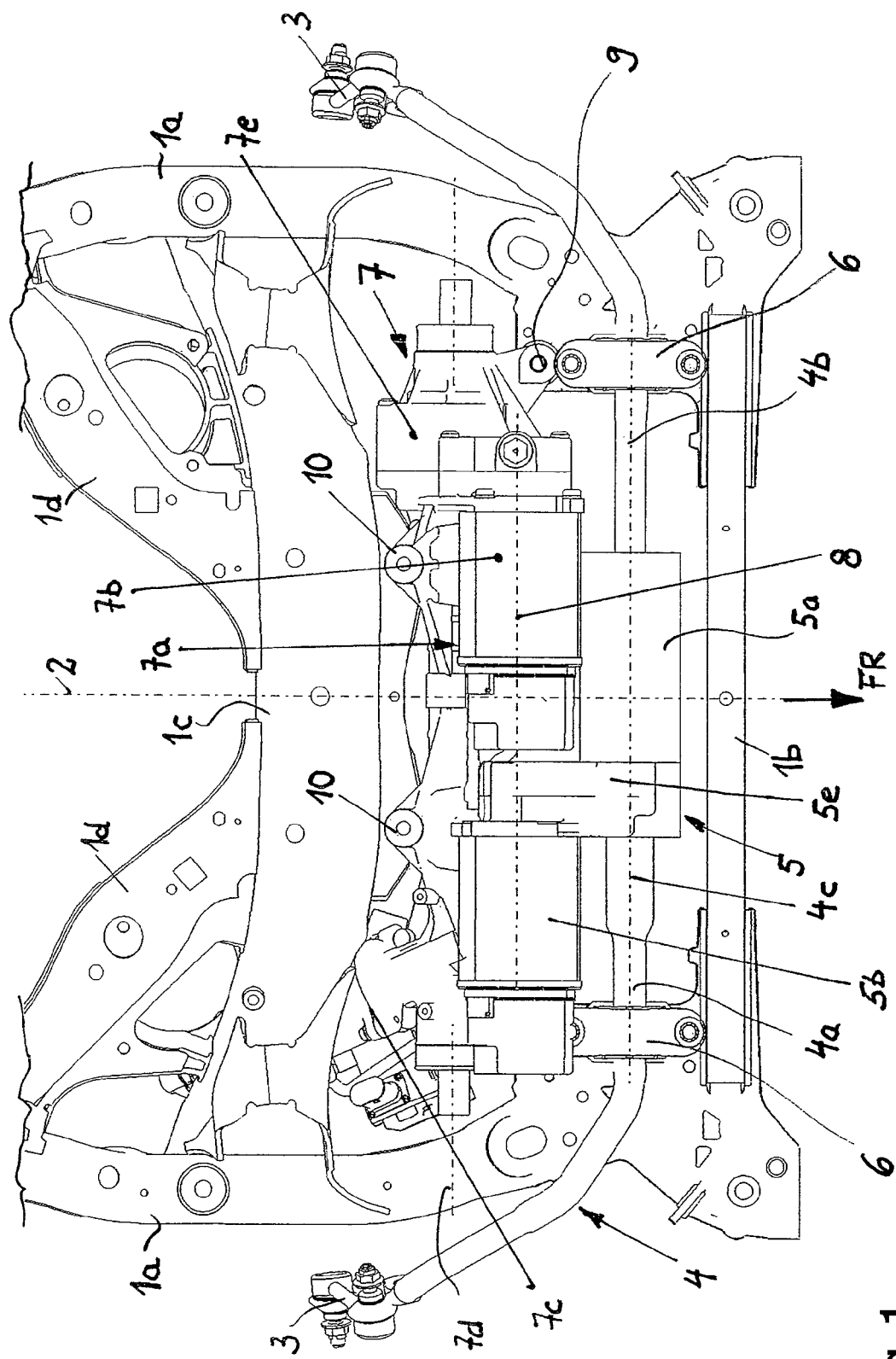

Referring to the FIGURE, the reference numeral 1 denotes a so-called axle carrier in its entirety. The axle carrier 1 is provided for the front axle of a passenger vehicle and consists, in essence, of two longitudinal members 1a of the carrier that extend in the longitudinal direction on both sides of the vehicle, and also a front cross member 1b and a rear cross member 1c, both of which are supported between the two longitudinal members 1a of the carrier. The central longitudinal axis of the vehicle is marked with the reference numeral 2, and the vehicle's direction of travel is indicated by the arrow FR. In addition, behind the rear cross member 1c, the seats 1d, which run symmetrically to the longitudinal axis 2 and are provided for the motor mount, are supported between the rear cross member 1c and the respective longitudinal member 1a of the carrier. The latter is cut off and, therefore, not completely visible in the FIGURE.

A lateral stabilizer 4 is provided in a manner that is well-known from the prior art. The lateral stabilizer 4 is arranged between the wheels, which are mounted on the left side (not shown in the FIGURE) and on the right side outside the front axle carrier 1 and are guided by conventional wheel control elements (also not shown in the FIGURE), which are supported to some extent on the front axle carrier 1. The left and the right side of the lateral stabilizer 4 is supported on one of the so-called wheel control elements or on a pivot bearing of the respective wheel that is well-known from the prior art by way of a pendulum support 3.

The lateral stabilizer 4 is split in the middle and, as a result, consists of a right-sided and a left-sided stabilizer half 4a and 4b respectively, both of which are connected together by a gear 5a such that these two stabilizer halves 4a, 4b, which are mounted at bearing points 6 so as to be rotatable about the axle carrier 1, can be rotated with their sections, extending over a common transverse axis 4c, in relation to each other by a certain angular amount about this transverse axis 4c. Consequently, it is possible to counteract a rolling of the vehicle chassis that is supported on the wheels in a manner that is well-known from the prior art. In this case the corresponding torque, which is called the stabilization torque and with which the stabilizer halves 4a, 4b are rotated in relation to each other, is introduced into the gear 5a from a motor 5b. Hence, the above described, split lateral stabilizer 4 forms, together with the gear 5a and the motor 5b, which may be an electric motor in this case, a so-called roll stabilization system 5.

In this respect, the FIGURE shows that the motor 5b of the roll stabilization system 5 is mounted at the side of the transverse axis 4c of the lateral stabilizer 4 and at the side of the gear 5a, and there is a suitable intermediate gear 5e, for example, in the form of a toothed gearing or an endless traction gear, for the purpose of transmitting the torque from the motor 5b into the gear 5a. In this context the term "at the side" that is used in the preceding sentence does not mean that the motor 5b is mounted at the side next to the gear 5a, but rather expresses that the axis of rotation of the motor 5b and the input or output axis of rotation of the gear 5a do not coincide.

Since the aforementioned wheels are the front wheels of the vehicle, they can be steered by way of a steering system 7. At this point it must be emphasized that a corresponding (inventive) arrangement of a roll stabilization system 5 as well as a steering system 7 (to be described briefly below) can also be provided for the rear wheels of a double track vehicle, that is, on its rear axle, if its rear wheels can be steered at least slightly. Furthermore, it must be pointed out that even though a power steering system equipped with a support torque that can be introduced into the power steering gear is described below, this invention can also be applied to a steer-by-wire system, in which only a motor induced movement torque is applied.

In the present case the steering system 7 (front axle) is designed as a rack and pinion steering system that is well-known from the prior art. That is, there is a rack and pinion steering gear 7a, which extends in the transverse direction of the vehicle and in which a steering angle, desired by the driver of the vehicle, can be introduced by way of a steering spindle connection 7c by way of a so-called steering spindle (not illustrated). Moreover, a support torque can be introduced by way of a motor 7b, which is also designed as an electric motor. A steering angle, which is introduced by the steering spindle, and/or a support torque, which is introduced by the motor 7b, bring(s) about movement of the steering arms or steering tie rods (not shown in the FIGURE) with their gear rack articulated points in the transverse direction of the vehicle. The steering arms or steering tie rods are linked on both sides of the rack and pinion steering gear 7a to the ends of its gear rack in a manner that is well-known from the prior art, and the other ends of the steering arms or steering tie rods are ultimately connected to the aforementioned pivot bearing of the respective wheel.

The corresponding so-called movement axis 7d, which extends in the transverse direction of the vehicle and is a component of the steering arms or the steering arms' articulated points on the rack and pinion steering gear 7a, is defined, as well-known, by the longitudinal direction of the gear rack of the rack and pinion steering gear 7a. Furthermore, it is clear from the FIGURE that the motor 7b of the steering system 7 is arranged at the side of the movement axis 7d and at the side of the rack and pinion steering gear 7a. In this context the phrase "at the side" can also stand for the concept "at the side next to." To transmit the torque of the motor 7b into the rack and pinion steering gear 7a there is a suitable intermediate gear 7e, for example, in the form of a toothed gearing.

Inside the frame, defined by the axle carrier 1, that is, inside the space, defined by the two longitudinal members 1a of the carrier and the cross members 1b, 1c, as well as, essentially, in the plane described by this axle carrier 1, the two motors 5b, 7b, that is, the electric motor 5b of the roll stabilization system 5 and the electric motor 7b of the steering system 7, are arranged so as to lie one behind the other in the transverse direction of the vehicle such that their axes of rotation essentially coincide, that is, lie essentially on a common motor rotational axis 8. This motor rotational axis 8 extends perpendicular to the longitudinal axis 2 of the vehicle in the transverse direction of the vehicle in a horizontal plane, lying parallel to the road. The result is an extremely compact configuration that does not require a lot of design space.

The rack and pinion steering gear 7a bears the associated motor 7b and is secured on each end respectively to the left and the right front corner area of the front axle carrier 1 by a support point 9. The FIGURE shows only one of these support points 9, because the other support point, which is mirror symmetrical to the longitudinal axis 2, is located behind the motor 5b in this view. By means of the two support points 10, provided in the central region of the housing of the rack and pinion steering gear 7a, the steering gear 7a together with the associated motor 7b is supported on the cross member 1c by way of the flange lugs, provided on the rear cross member 1c. In this way, the steering system 7 contributes to the reinforcement of the axle carrier 1. In an analogous manner, the motor 5b of the roll stabilization system 5 and/or its gear 5a can be supported (a feature that is not evident from the accompanying FIGURE), on the one hand, between a corner region of the axle carrier 1 and, on the other hand, a cross member 1b or 1c of the axle carrier 1. Similarly, the FIGURE does not show another possible support of the two motors 5b and 7b and/or their motors 5b, 7b, associated gear 5a, 7a, and/or the respective intermediate gear 5e, 7e in relation to each other, so that the steering system 5 (naturally with the exception of the steering arms) and the roll stabilization system 7 (naturally with the exception of the lateral stabilizer 4) are ultimately supported on each other and, thus, can enhance the rigidity of the entire arrangement and the axle carrier 1. Yet this feature as well as many other details relating especially to the design can be configured differently from the above explanations by one of skill in the art.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An arrangement for a double track motor vehicle, comprising:
 a roll stabilization system comprising:
  a split lateral stabilizer of the roll stabilization system;
  a gear of the roll stabilization system arranged essentially coaxially between both halves of the lateral stabilizer, said halves of the lateral stabilizer being rotatable with respect to one another;
  a first motor operatively configured to introduce into the roll stabilization system a stabilization torque, the motor being arranged at a side of the gear and the split lateral stabilizer; and
 a steering system comprising:
  a steering gear of the steering system;
  steering arms movable essentially in a transverse direction of the vehicle by way of the steering gear;
  a second motor arranged at a side of the steering gear and a movement axis defined by the movable steering arms, the second motor being operatively configured to introduce a torque that assists in moving the steering arms;
 wherein the first motor of the roll stabilization system and the second motor of the steering system are operatively configured essentially to have coinciding axes of rotation in the transverse direction of the vehicle.

2. The arrangement according to claim 1, wherein the first motor and the second motor are electric motors having essentially coinciding axes of rotation, said axes extending in the transverse direction of the vehicle.

3. The arrangement according to claim 2, further comprising:
 an axle carrier; and
 wherein the first motor and the second motor are arranged inside the axle carrier so as to lie essentially in a plane of the axle carrier.

4. The arrangement according to claim 3, wherein the first and second motors are supported between a corner point of the axle carrier and a cross member of the axle carrier.

5. The arrangement according to claim 3, wherein the first motor and its associated gear form a first motor gear unit and the second motor and its associated gear form a second motor gear unit, said first and second motor gear units being supported between a corner point of the axle carrier and a cross-member of the axle carrier.

6. The arrangement according to claim 1, further comprising:
 an axle carrier; and
 wherein the first motor and the second motor are arranged inside the axle carrier so as to lie essentially in a plane of the axle carrier.

7. The arrangement according to claim 6, wherein the first and second motors are supported between a corner point of the axle carrier and a cross member of the axle carrier.

8. The arrangement according to claim 7, wherein the first and second motors are supported in relation to each other viewed in the transverse direction of the vehicle.

9. The arrangement according to claim 6, wherein the first motor and its associated gear form a first motor gear unit and the second motor and its associated gear form a second motor gear unit, said first and second motor gear units being supported between a corner point of the axle carrier and a cross-member of the axle carrier.

10. The arrangement according to claim 9, wherein the first and second motor gear units are supported in relation to each other when viewed in the transverse direction of the vehicle.

\* \* \* \* \*